United States Patent [19]
Rivers et al.

[11] Patent Number: 5,948,330
[45] Date of Patent: Sep. 7, 1999

[54] METHOD OF FABRICATING CHOPPED-FIBER COMPOSITE PISTON

[75] Inventors: H. Kevin Rivers, Hampton; Philip O. Ransone, Gloucester; G. Burton Northam, Carrollton, all of Va.

[73] Assignee: The United States of America as represented by the Administrator of the National Aeronautics and Space Administration, Washington, D.C.

[21] Appl. No.: 08/816,403

[22] Filed: Mar. 5, 1997

Related U.S. Application Data

[60] Provisional application No. 60/012,930, Mar. 6, 1996.

[51] Int. Cl.$^6$ .................................................. C01B 31/04
[52] U.S. Cl. ...................... 264/29.5; 264/29.7; 264/162; 92/172; 92/212
[58] Field of Search ..................................... 264/29.5, 162, 264/29.7; 92/172, 212

[56] References Cited

U.S. PATENT DOCUMENTS

| | | |
|---|---|---|
| 4,683,809 | 8/1987 | Taylor . |
| 4,694,735 | 9/1987 | Tatematsu et al. . |
| 4,736,676 | 4/1988 | Taylor . |
| 4,909,133 | 3/1990 | Taylor . |
| 5,083,537 | 1/1992 | Onofrio et al. . |
| 5,101,556 | 4/1992 | Fluga et al. . |
| 5,370,087 | 12/1994 | Guimond et al. . |
| 5,525,276 | 6/1996 | Okuyama et al. ...................... 264/29.3 |
| 5,578,255 | 11/1996 | Okuyama et al. . |

*Primary Examiner*—James Derrington
*Attorney, Agent, or Firm*—Kurt G. Hammerle

[57] ABSTRACT

A three-dimensional piston molding is fabricated from a mixture of chopped, carbon tow filaments of variable length, which are prepregged with carbonaceous organic resins and/or pitches and molded by conventional molding processes into a near net shape, to form a carbon-fiber reinforced organic-matrix composite part. Continuous reinforcement in the form of carbon-carbon composite tapes or pieces of fabric can be also laid in the mold before or during the charging of the mold with the chopped-fiber mixture, to enhance the strength in the crown and wrist-pin areas. The molded chopped-fiber reinforced organic-matrix composite parts are then pyrolized in an inert atmosphere, to convert the organic matrix materials to carbon. These pyrolized parts are then densified by reimpregnation with resins or pitches, which are subsequently carbonized. Densification is also accomplished by direct infiltration with carbon by vapor deposition processes. Once the desired density has been achieved, the piston molds are machined to final piston dimensions, and piston ring grooves are added. To prevent oxidation and/or to seal the piston surface or near surface, the chopped-fiber piston is coated with ceramic and/or metallic sealants; and/or coated with a catalyst.

16 Claims, 2 Drawing Sheets

10

METHOD OF FABRICATING CHOPPED-FIBER COMPOSITE PISTON

CLAIM OF BENEFIT OF PROVISIONAL APPLICATION

Pursuant to 35 U.S.C. §119, the benefit of priority from provisional application 60/012,930, with a filing date of Mar. 6, 1996, is claimed for this non-provisional application.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to lightweight piston design, and more specifically to improved structures for a carbon-carbon composite piston.

2. Description of the Related Art

Internal combustion reciprocating engines and compressors used for aerospace, military, and transportation applications must be lightweight and capable of operating at elevated temperatures and pressures. Current state-of-the-art of piston manufacture employs aluminum alloys and steel because pistons composed of these materials can withstand the relatively high temperatures and pressures associated with operation of an internal combustion engine or compressor. However, engine and compressor pistons manufactured of steel and/or aluminum alloys are very heavy.

Aside from weight concerns, one disadvantage of aluminum alloy pistons is an inherent, relatively high coefficient of thermal expansion, which necessitates larger clearances between an aluminum alloy piston and an engine cylinder liner, to allow for expansion of the aluminum alloy piston during engine warm-up. Even at operating temperature, a clearance has to be maintained to allow for further piston expansion in the event that the engine experiences overheating due to intermittent, heavy loading or accidental loss of coolant. In order to seal the gap between an aluminum alloy piston and engine cylinder liner, the piston must be fitted with a plurality of piston rings which effectively seal the gap.

Another drawback associated with operation of an aluminum alloy piston at operating temperatures above 500 degrees Fahrenheit (°F.), is a dramatic decrease in mechanical strength. This strength loss precludes locating the uppermost compression piston ring close to the top or crown of the piston and may result in piston failure. As a result of the restriction on placing the uppermost piston compression ring close to the piston crown, a crevice between the piston crown and the uppermost piston compression ring is created. Because fuel mixture which reaches this crevice does not burn completely, the crevice contributes to atmospheric pollution and reduces fuel efficiency. Steel pistons have sufficient strength at higher temperatures but are excessively heavy.

Yet another disadvantage of aluminum alloy pistons also results from the thermal expansive properties of the alloy. As undersized aluminum alloy pistons "rock" inside the cylinder chamber, they can be noisy until such time as they have sufficiently expanded in size to better fit the cylinder chamber dimensions. Carbon-carbon composite pistons have greater dimensional stability, i.e. are less thermally expansive and therefore consistently retain their dimensions, hence producing no engine knocking during cold operation.

In a recent development, internal combustion engine and/or compressor pistons are fabricated from carbon-carbon composite materials to reduce engine weight, improve engine efficiency, reduce hydrocarbon emissions, potentially eliminate the need for piston rings, and produce a less noisy engine. These carbon-carbon composite pistons retain their strength under operating conditions which exceed 1200° F., and are lighter than either steel or aluminum alloy pistons.

Carbon-carbon composite pistons, however, are fabricated by manually laying-up and molding prepregged fabrics, tapes, or felted preforms. Such processes are labor-intensive and, therefore, expensive. These carbon-carbon composite pistons also have reduced interlaminar strength and exhibit anisotropy in their mechanical properties, thermal expansion, and thermal conductivity.

SUMMARY OF THE INVENTION

Accordingly an object of this invention is to reduce the weight of an internal combustion reciprocating engine and/or compressor.

It is another object of the present invention to provide an engine and/or compressor piston with adequate mechanical strength during high engine operating temperatures, resulting in lower distortion and higher dimensional stability.

Another object of the present invention is to provide an engine and/or compressor piston which eliminates low interlaminar strength.

Yet another object of the present invention is to provide an engine and/or compressor piston which can be cheaply mass produced.

Still another object of the present invention is to provide an engine and/or compressor piston with isotropic mechanical and physical properties as well as thermal expansion and thermal conductivity.

It is yet another object of the present invention to provide an engine and/or compressor piston which can be ringless.

It is a further object of the present invention to provide an engine and/or compressor piston which improves engine operating efficiency.

It is an additional object of the present invention to provide an engine and/or compressor piston which operates more quietly.

It is a further object of the present invention to provide an engine and/or compressor piston which reduces the emission of hydrocarbons during operation by reducing the crevice volume.

According to the present invention, the foregoing and additional objects are attained by fabricating a three-dimensional piston molding from a mixture of chopped, carbon tow filaments of uniform or variable length, and of carbonaceous organic resins and/or pitches, which is molded by conventional molding processes into a near net shape, to form a carbon-fiber reinforced organic-matrix composite part. Continuous reinforcement in the form of carbon-carbon composite tapes or pieces of fabric can be also laid in the mold before or during the charging of the mold with the chopped-fiber mixture, to enhance the strength in the crown and wrist-pin areas. The molded chopped-fiber reinforced organic-matrix composite parts are then pyrolized in an inert atmosphere, to convert the organic matrix materials to carbon. These pyrolized parts are then densified by reimpregnation with resins or pitches, which are subsequently carbonized. Densification is also accomplished by direct infiltration with carbon by vapor deposition processes. Once the desired density has been achieved, the piston molds are machined to final piston dimensions, and piston ring grooves are added. To prevent oxidation and/or to seal the piston surface or near surface, the chopped-fiber piston is coated with ceramic and/or metallic sealants; and/or coated with a catalyst.

Like conventional carbon-carbon composite pistons, chopped-fiber pistons are lighter than aluminum alloy pistons. Unlike conventional carbon-carbon composite pistons, however, chopped-fiber pistons exhibit less strength than aluminum alloy pistons at room temperature. However, chopped-fiber pistons retain their strength at higher operating temperatures while aluminum alloy pistons experience a dramatic loss of strength. Chopped-fiber is molded into a better, i.e. more perfect, net shape mold which requires less finishing than for a cast aluminum alloy piston.

DETAILED DESCRIPTION OF THE INVENTION

Carbon-carbon composite materials, as used herein, refers to a predominantly carbon matrix material reinforced with predominantly carbon fibers. The properties of these materials may be tailored to produce any desired mechanical and physical properties by preferred orientation of the continuous or staple fibers in the composite materials; and/or by the selection of additives; and/or by thermal treatment of the fibers and matrix before, during, or after fabrication. Carbon-carbon composite materials may be cast or molded, and are machineable. The surface or near-surface material can also be treated and/or coated with oxidation protection or sealing materials, or with catalytic materials such as nickel.

Figure 1:
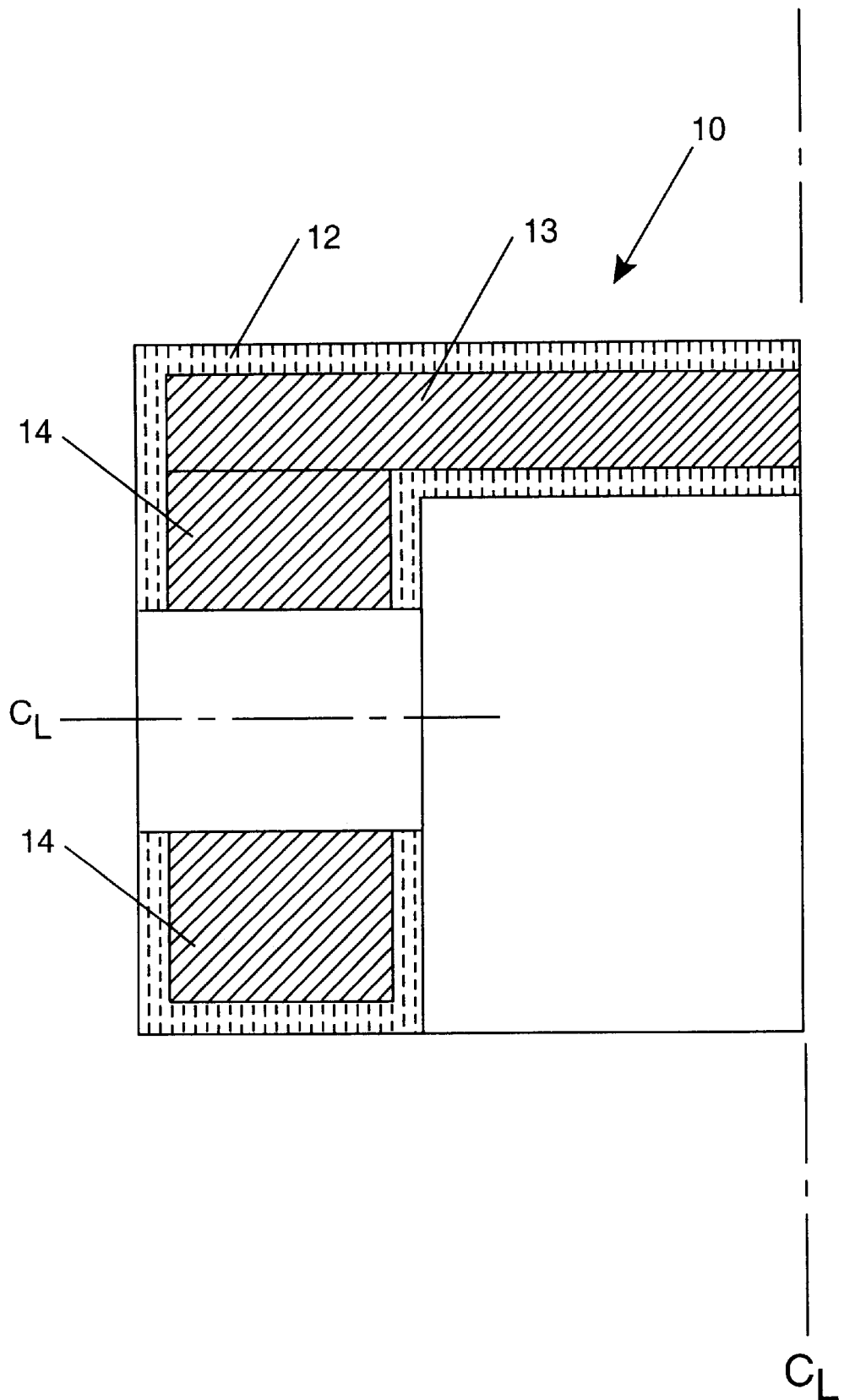
FIG. 1 is an illustration of a prior art knitted carbon fiber structure engine piston.

The present invention is an improvement in the manufacture and structure of a lightweight carbon-carbon composite engine piston for use in internal combustion engines and/or compressors. U.S. Pat. No. 4,909,133 by Taylor et al. discloses the use of knitted or warp interlock preforms which are embedded in the composite matrix so as to comprise structural components of the completed piston. The lightweight piston architecture of Taylor et al. is shown as FIG. 1 which depicts a carbon-carbon composite engine piston 10 which has a knitted or woven carbon fiber structure 12 which is selectively reinforced with directionally-oriented carbon fibers at the crown 13 and adjacent to the wrist pin boss 14.

The improvement of the present invention comprehends fabricating carbon-carbon composite pistons from a near net-shaped molding composed of chopped carbon tow bundles, i.e. "chopped fiber." These tow bundles consist of between 2,000 to 3,000 individual carbon filaments wrapped about one another with a common axis, such that the tow bundle has a diameter of approximately 0.5 mm. The chopped fibers should not exceed 0.5 inches in length, which can be of uniform or variable length. The preferred embodiment employs chopped fibers of variable length. Additives and/or fillers with properties tailored to yield desirable thermal and/or structural properties may be added to the chopped-fiber matrix before it is charged into the mold.

Figure 2:
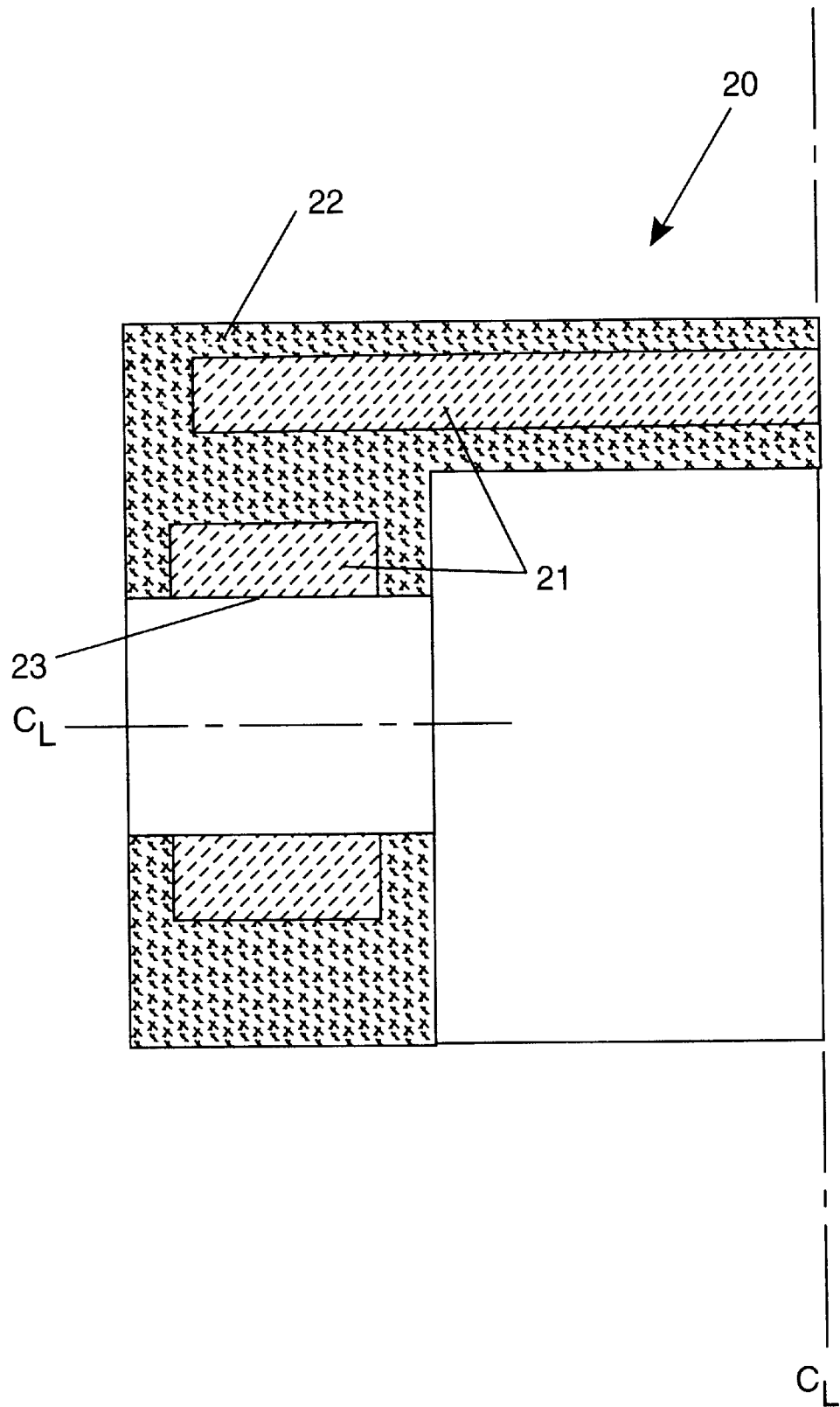
FIG. 2 is an illustration of a near net-shaped chopped-fiber piston.

Refer to FIG. 2 which depicts a chopped fiber piston 20. The improved architecture of the present invention was created by process which began by cutting or chopping carbon tow bundles into uniform or variable lengths not to exceed 0.5 inches. These chopped-fibers were then blended with carbonaceous resins, i.e. the matrix resin, and any desired additives and/or fillers. Chopping carbon tow bundles and blending them with resin can be done separately, in individual steps, or in a single step by any known chopping or blending means. Mixing the chopped fibers, matrix resin, and additives or fillers in a blender is the preferred single-step means.

The chopped fiber-resin mixture was then charged in a near-net shape mold by conventional molding techniques.

Continuous reinforcement in the crown 21 and wrist-pin area 23, where higher strengths are required, can be incorporated into the molding by laying continuous tape or fabric pieces into the mold at desired locations and adding the chopped-fiber mixture as required. Continuous reinforcement may be applied first, last, or alternately, along with the chopped-fiber mixture.

The near net-shape molding was then heated to cure the matrix resin. Typically, the molding curing temperature ranges between 300 and 400 degrees F.

The cured near-net shaped molding was then removed from its mold and pyrolized to a temperature of 900 degrees Celsius (°C.) in an inert-atmosphere furnace, to convert the organic matrix material into carbon. A pyrolizing temperature of 2700° C. may be required if any graphitizable constituents were included in the matrix precursor resins as an additive, to form graphite in situ or if graphitization of the fibers is desirable.

The density of the pyrolized, chopped-fiber molding is increased, as required, by one or more cycles of resin reimpregnation and carbonization as described in U.S. Pat. No. 4,683,809 (Taylor). Alternately, densification is effected by direct deposition of carbon in the pores of the chopped fiber molding using chemical vapor deposition processes which are known in the art.

Once the desired densification was achieved, all densified chopped fiber moldings were then machined and burnished to final dimensions, to produce a chopped-fiber piston 20. If desired or required, grooves (not shown) for piston rings (not shown) may be machined into the completed chopped fiber piston 20. Typically, diamond impregnated grinding tools are used for machining, as single-point cutting tools tend to tear out fibers and chip out bits of the matrix leaving an unacceptable surface. Burnishing the surfaces of the piston skirt, ring groove, and wrist pin hole to the final critical dimensions is desirable, to minimize or eliminate the wear which can be experienced when carbon-carbon surfaces initially contact other surfaces.

The piston crown, ring groove, and piston skirt surfaces are coated with a ceramic or with a metallic coating, as required, to seal the surface, provide some protection against oxidation, and/or provide better tribological properties. Catalytic coatings, such as nickel, also may be applied to the crown surfaces 22 of the finished chopped-fiber piston.

The invention can be practiced in other manners than are described herein without departing from the spirit and the scope of the appended claims.

What is claimed is:

1. A process for fabricating carbon fiber pistons, which comprises:
   (a) cutting carbon tow bundles into chopped fibers which are defined by a length;

(b) mixing said chopped fibers with a carbonaceous resin, to form a chopped-fiber mixture;

(c) introducing additives or fillers into the chopped-fiber mixture, to impart desired thermal and structural properties to said chopped-fiber mixture;

(d) charging the chopped-fiber mixture containing additives or fillers into a mold assembly, to form a chopped-fiber molding;

(e) inserting continuous reinforcement where higher mechanical strengths are desired;

(f) heating the chopped-fiber molding, to cure the carbonaceous resin;

(g) pyrolizing the heated chopped-fiber molding, to carbonize the heated chopped-fiber molding;

(h) re-impregnating the heated chopped-fiber molding with additional carbonaceous resin;

(I) re-pyrolizing the re-impregnated carbonized chopped-fiber molding, to further densify the chopped-fiber molding; and (j) machining the further densified chopped-fiber molding to final dimensions, producing a chopped-fiber piston with a crown and complete piston skirt surfaces.

2. The process for fabricating carbon fiber pistons of claim 1, wherein the length of the chopped fibers does not exceed 0.50 inches.

3. The process for fabricating carbon fiber pistons of claim 1, wherein the length of the chopped fibers is variable.

4. The process for fabricating carbon fiber pistons of claim 1, wherein the length of the chopped fibers is uniform.

5. The process for fabricating carbon fiber pistons of claim 1, wherein mixing is accomplished by blending.

6. The process for fabricating carbon fiber pistons of claim 1, wherein the continuous reinforcement is a carbon-carbon composite tape.

7. The process for fabricating carbon fiber pistons of claim 1, wherein the reinforcement is a piece of carbon-carbon composite fabric.

8. The process for fabricating carbon fiber pistons of claim 1, wherein the chopped-fiber molding is heated to a temperature between about 300 and 400 degrees Fahrenheit, to cure the carbonaceous resin.

9. The process for fabricating carbon fiber pistons of claim 1, wherein the heated chopped-fiber molding is pyrolized at a temperature of approximately 900 degrees Centigrade, to carbonize the carbonaceous resin.

10. The process for fabricating carbon fiber pistons of claim 1, wherein the chopped-fiber molding is pyrolized at a temperature of approximately 2700 degrees Centigrade, to form in situ graphite.

11. The process for fabricating carbon fiber pistons of claim 1, further comprising the step of:

machining ring grooves into the machined chopped-fiber piston.

12. The process for fabricating carbon fiber pistons of claim 1, further comprising the step of:

coating the crown and piston skirt surface of the machined chopped-fiber piston with a sealant for oxidation protection.

13. The process for fabricating carbon fiber pistons of claim 12, wherein the sealant is a ceramic coating.

14. The process for fabricating carbon fiber pistons of claim 12, wherein the sealant is a metallic coating.

15. The process for fabricating carbon fiber pistons of claim 1, further comprising the step of:

coating the crown surface of the machined chopped-fiber piston with a catalytic coating.

16. The process for fabricating carbon fiber pistons of claim 15, wherein the catalytic coating is nickel.

* * * * *